L. S. WHITELAW.
HISTORICAL AND EDUCATIONAL PUZZLE.
APPLICATION FILED JAN. 28, 1911.
994,227.
Patented June 6, 1911.
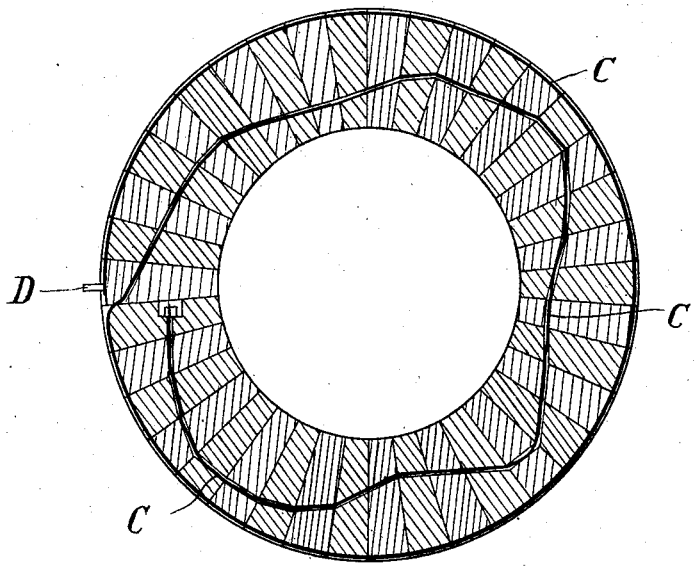
FIG: 1.
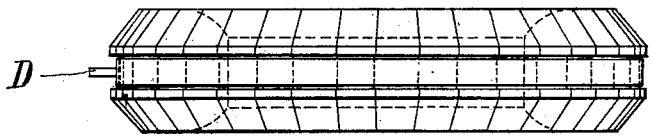
FIG: 2.
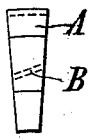 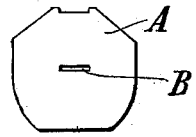
FIG: 3.   FIG: 4
Witnesses
Inventor

UNITED STATES PATENT OFFICE.

LAURENCE STUART WHITELAW, OF LONDON, ENGLAND.

HISTORICAL AND EDUCATIONAL PUZZLE.

994,227.  Specification of Letters Patent.  Patented June 6, 1911.

Application filed January 28, 1911. Serial No. 605,273.

*To all whom it may concern:*

Be it known that I, LAURENCE STUART WHITELAW, residing at 7/8 Idol Lane, London, England, a British subject of King George V, have invented a new and Improved Historical and Educational Puzzle, of which the following is a specification.

My invention relates to a historical and educational puzzle and consists in placing the names of historical persons, places and events, upon suitable material the material being made in an appropriate geometrical figure, and constructed in such a manner that when the design is formed correctly the names of the historical persons, places or events come in their due and proper order in accordance with history.

In the drawing it will be seen that Figure 1 is the half section of the circle Fig. 2 showing the passage of the flexible band C, through and then around the circle, the flexible band holding and clasping the segments or blocks Figs. 3 and 4, which comprise the circle Figs. 1 and 2. Fig. 2, shows the outer edge of the circle and also the flexible band passing around and fastening on the clasp or peg D. Figs. 3, and 4, are sections of the circle showing also the slot B, through which the flexible band passes. The slot B, is of course in a different position in each segment or block.

The historical and educational puzzle consists of a series of segments or blocks (A, Figs. 3 and 4) each being provided with a hole or slot (B Figs. 3 and 4) cut in it but such hole being in a different position in the various segments or blocks. Historical names dates or other designs are marked on the surfaces of the blocks in such a manner that when the blocks are assembled as shown in Figs. 1 and 2 to form a circle or geometrical figure the names are arranged in proper sequence. A flexible band (C) or the like is passed through the slots in the blocks and continued around the circumference of the assembled puzzle the outer end being secured by a clasp or peg (D) or otherwise. Part of the data or design is marked on the band so as to correspond with the marking on the blocks. The blocks may be made of any suitable material.

The method of performing the puzzle consists in stringing the blocks on the flexible band or suitable contrivance in accordance with one's knowledge of the chronological sequence of the various names and facts marked upon the surfaces of the blocks. If correctly done the blocks form a complete circle or geometrical figure. If the blocks are not strung on the flexible band in the proper chronological sequence of the various names or facts marked on the surfaces of the blocks it is impossible to form them into a complete circle or geometrical figure. Those blocks which have been incorrectly placed can be detected by their interfering with or preventing the symmetry of the circle or geometrical figure.

Having now particularly described and ascertained the nature of my said invention and in what manner the same is to be performed I declare that what I claim is:—

An improved historical and educational puzzle comprising a series of blocks, each containing historical data, which when arranged in the order of the names, words, dates or numbers thereon will form a geometrical figure, and means for securing the blocks together to form said figure, said means sustaining to each block a different relation than that existing between said means and any other block, whereby the blocks can be arranged to form said figures only when they are in regular chronological order.

Dated the 23rd day of May, 1911.

LAURENCE STUART WHITELAW.

Witnesses:
 RIPLEY WILSON,
 MORTIMER EDWARD OLIVER JAMES.

---

Copies of this patent may be obtained for five cents each, by addressing the "Commissioner of Patents, Washington, D. C."